United States Patent
Gibson et al.

(10) Patent No.: US 7,762,237 B2
(45) Date of Patent: Jul. 27, 2010

(54) METHOD FOR DETERMINING VALVE DEGRADATION

(75) Inventors: Alex O'Connor Gibson, Ann Arbor, MI (US); Jeffrey Allen Doering, Canton, MI (US); Nelson William Morrow, Jr., Saline, MI (US); James Donald McCoy, Flat Rock, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 514 days.

(21) Appl. No.: 11/851,424

(22) Filed: Sep. 7, 2007

(65) Prior Publication Data
US 2009/0066337 A1    Mar. 12, 2009

(51) Int. Cl.
*F02D 7/00* (2006.01)
*G06F 19/00* (2006.01)
(52) U.S. Cl. .................... 123/481; 123/198 F; 701/114
(58) Field of Classification Search .............. 123/198 F, 123/481, 625; 701/101, 114
See application file for complete search history.

(56) References Cited

U.S. PATENT DOCUMENTS

| 5,492,100 | A | 2/1996 | Ishii et al. |
| 6,386,156 | B1 | 5/2002 | Stockhausen et al. |
| 6,499,470 | B2 | 12/2002 | Takagi et al. |
| 6,691,021 | B2 | 2/2004 | Takagi et al. |
| 7,032,581 | B2 * | 4/2006 | Gibson et al. ............... 123/673 |
| 7,082,934 | B2 * | 8/2006 | Winstead et al. ............ 123/625 |
| 7,124,019 | B2 | 10/2006 | Goodell et al. |
| 7,134,423 | B2 | 11/2006 | Zhu et al. |
| 7,156,082 | B2 * | 1/2007 | Winstead et al. ............ 123/625 |
| 7,277,789 | B1 * | 10/2007 | Gibson et al. ............... 701/104 |
| 7,546,827 | B1 * | 6/2009 | Wade et al. .................. 123/324 |
| 2006/0207569 | A1 * | 9/2006 | Winstead et al. ............ 123/479 |
| 2007/0234984 | A1 * | 10/2007 | Kolmanovsky et al. .. 123/90.15 |

FOREIGN PATENT DOCUMENTS

EP    1143116    5/2005

* cited by examiner

*Primary Examiner*—John T Kwon
(74) *Attorney, Agent, or Firm*—Allan J. Lippa; Alleman Hall McCoy Russell & Tuttle LLP

(57) ABSTRACT

A method for determining degraded valve operation. According to the method, valve degradation can be determined from the duration of a spark event. This method allows for the determination of both intake and exhaust valve degradation.

24 Claims, 7 Drawing Sheets

METHOD FOR DETERMINING VALVE DEGRADATION

FIELD

The present description relates to a method for improving recognition of valve degradation for an internal combustion engine having a variable event valvetrain. The method may be particularly useful for vehicles that utilize cylinder deactivation.

BACKGROUND

One method to determine valve degradation in an internal combustion engine is described in U.S. Pat. No. 6,499,470. This method presents a method for determine degradation of a cylinder halting mechanism based on the rate of change in intake manifold pressure. If the manifold pressure rate of change is low, fuel flow can be stopped to the one or more cylinders.

The above-mentioned method can also have several disadvantages. Specifically, the method does not appear to be capable of determining a condition where operation of an exhaust valve degrades while intake valves are deactivated. For example, if intake and exhaust valves are commanded to closed positions to deactivate a cylinder, intake manifold pressure will not be affected by exhaust valve degradation because the intake valve isolates the intake manifold from conditions in the cylinder and exhaust system. As a result, the rate of change of intake manifold pressure will not be affected by operation of the exhaust valve. Consequently, the method does not appear to be able to diagnose exhaust valve degradation from at least an attribute of said spark event. This method overcomes at least some of the disadvantages of the prior art.

Valve degradation can be assessed by determining the duration of an ignition spark in a cylinder. Spark duration (i.e., the length of time from the beginning of a spark to the end of a spark) can be related to cylinder pressure and cylinder pressure can be related to the position of a valve at a particular crankshaft angle. Alternatively, breakdown voltage may be used as an indication of cylinder pressure. Consequently, spark duration and/or breakdown voltage can be used to determine the position and/or operation of a valve at a particular crankshaft angle, thereby allowing the determination of valve degradation.

During cylinder deactivation, it is common to deactivate a cylinder by closing all valves operating in a cylinder. The valves are closed to reduce engine pumping losses and to limit oxygen flow to the exhaust system after treatment devices. Exhaust gases can be trapped in deactivated cylinders to act as a spring, storing and releasing rotational energy in the cylinder. However, if an exhaust valve stays open or opens and closes during a cycle when valve deactivation is desirable, the benefit of cylinder deactivation can be reduced. The present method permits a spark to be initiated in a cylinder during a scheduled cylinder deactivation period to determine if the cylinder pressure indicates that an exhaust valve is in a desired position at a particular crankshaft interval. This allows determination of exhaust valve degradation when intake valves are deactivated in a closed position.

Further, the method can be used to determine if an exhaust valve is in a desired position during an exhaust stroke so that exhaust valve degradation can be assessed before fuel is injected to a cylinder during cylinder reactivation. For example, a spark event can be initiated in a cylinder during an exhaust stroke while exhaust valves are scheduled to open. If the spark duration indicates that cylinder pressure is higher than expected, exhaust valve degradation may be determined. If the spark duration indicates that cylinder pressure is near an expected value, then it may be determined that the exhaust valve is not degraded. The exhaust valve evaluation may then be used to determine whether or not it is desirable to inject fuel to the cylinder.

The present description may provide several advantages. In particular, the approach may enable rapid and reliable evaluation of both intake and exhaust valves. By ingeniously linking attributes of a spark event to valve degradation, the inventors herein have developed an inexpensive and reliable method to determine valve degradation. In this regard, the method may also help reduce engine emissions if valve degradation occurs. Further, the method does not require pressure transducers or other function specific transducers; it simply uses an existing spark plug to make a determination of valve degradation. As such, the system and method may be implemented at a low cost.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
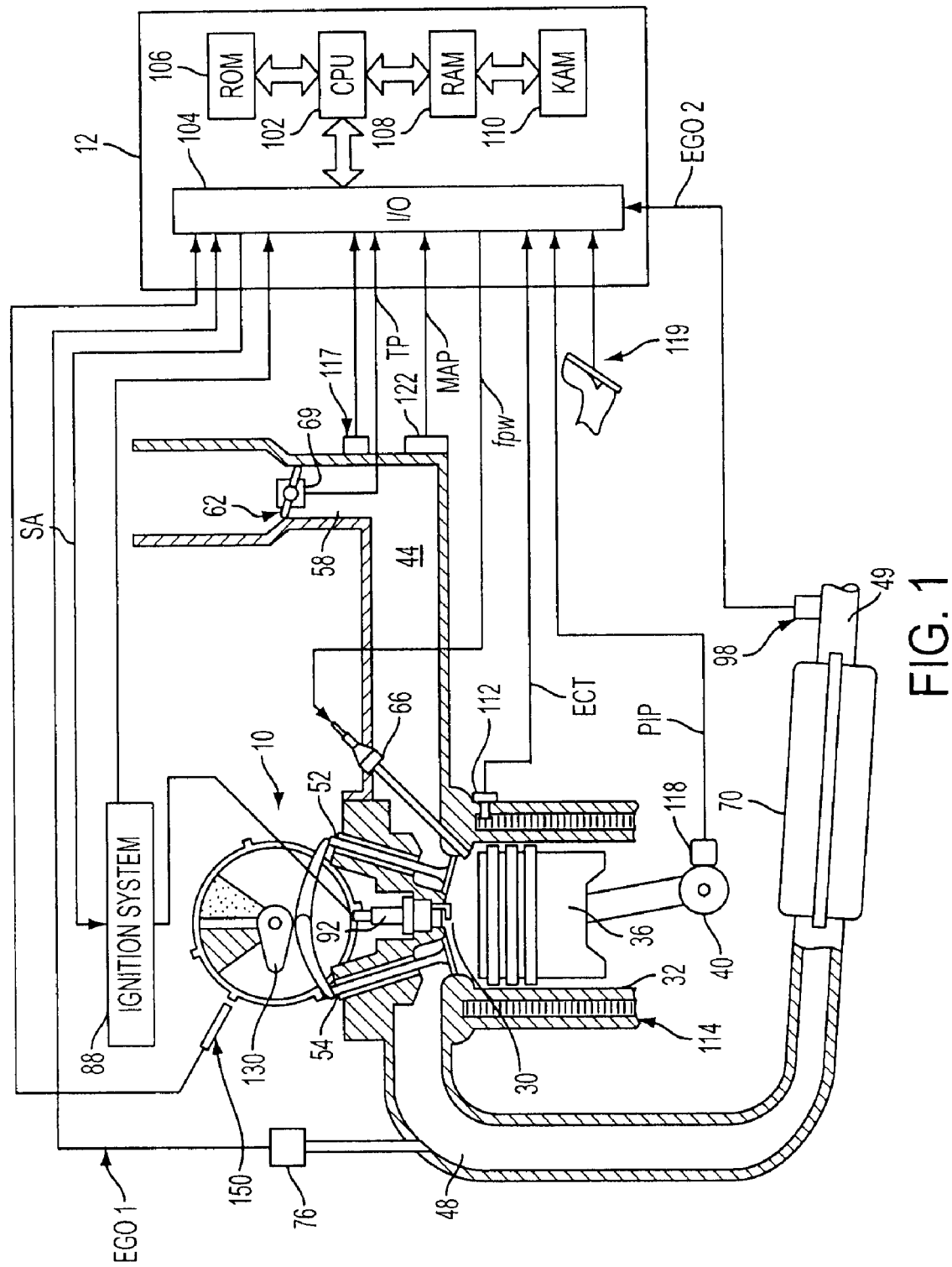
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with cam shaft 130 and piston 36 positioned therein and connected to crankshaft 40. Combustion chamber 30 is known communicating with intake manifold 44 and exhaust manifold 48 via respective intake valve 52 an exhaust valve 54. Intake valve 52 and exhaust valve 54 may be selectively activated and deactivated using a lost motion device (not shown) or alternatively by electric and/or hydraulic actuators. Fuel injector 66 is shown having a nozzle capable of injecting fuel directly into combustion chamber 30 in an amount in proportion to the pulse width of signal FPW from controller 12. Alternatively, fuel may be injected to the intake valve port upstream of intake valve 52. Fuel is delivered to fuel injector 66 by fuel system (not shown) including a fuel tank, fuel pump, and fuel rail (not shown). Intake manifold 44 is also shown communicating with throttle body 58 via throttle plate 62.

Distributorless ignition system 88 provides ignition spark to combustion chamber 30 via spark plug 92 in response to controller 12. Ignition system 88 contains circuitry (not shown) that is capable of determining the peak breakdown voltage and duration of ignition spark (i.e., the time that the spark arcs between two elements, such as a spark plug electrode). The breakdown voltage and ignition spark duration are made available (breakdown voltage and spark duration may be analog or digital in character) to controller 12. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust pipe 49 downstream of catalytic converter 70. Sensor 76 provides signal EGO1 to controller 12.

Controller 12 is shown in FIG. 1 as a conventional microcomputer including: microprocessor unit 102, input/output ports 104, and read-only memory 106, random-access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold absolute pressure (MAP) form pressure sensor 122 coupled to intake manifold 44; throttle plate position from sensor 69, a measurement (ACT) of engine air amount temperature or manifold temperature from temperature sensor 117; a cam position signal (CAM) from a variable reluctance cam sensor 150; and a crankshaft position signal (CPS) from a variable reluctance sensor 118 coupled to a crankshaft 40, and an engine torque demand sensor 119. Alternatively, other types of sensors may be substituted for the above-mentioned sensor type (e.g., Hall sensors or optical sensors may be used in place of variable reluctance sensors). Controller 12 storage medium read-only memory 106 can be programmed with computer readable data representing instructions executable by processor 102 for performing the methods described below as well as other variants that are anticipated but not specifically listed.

Figure 2:
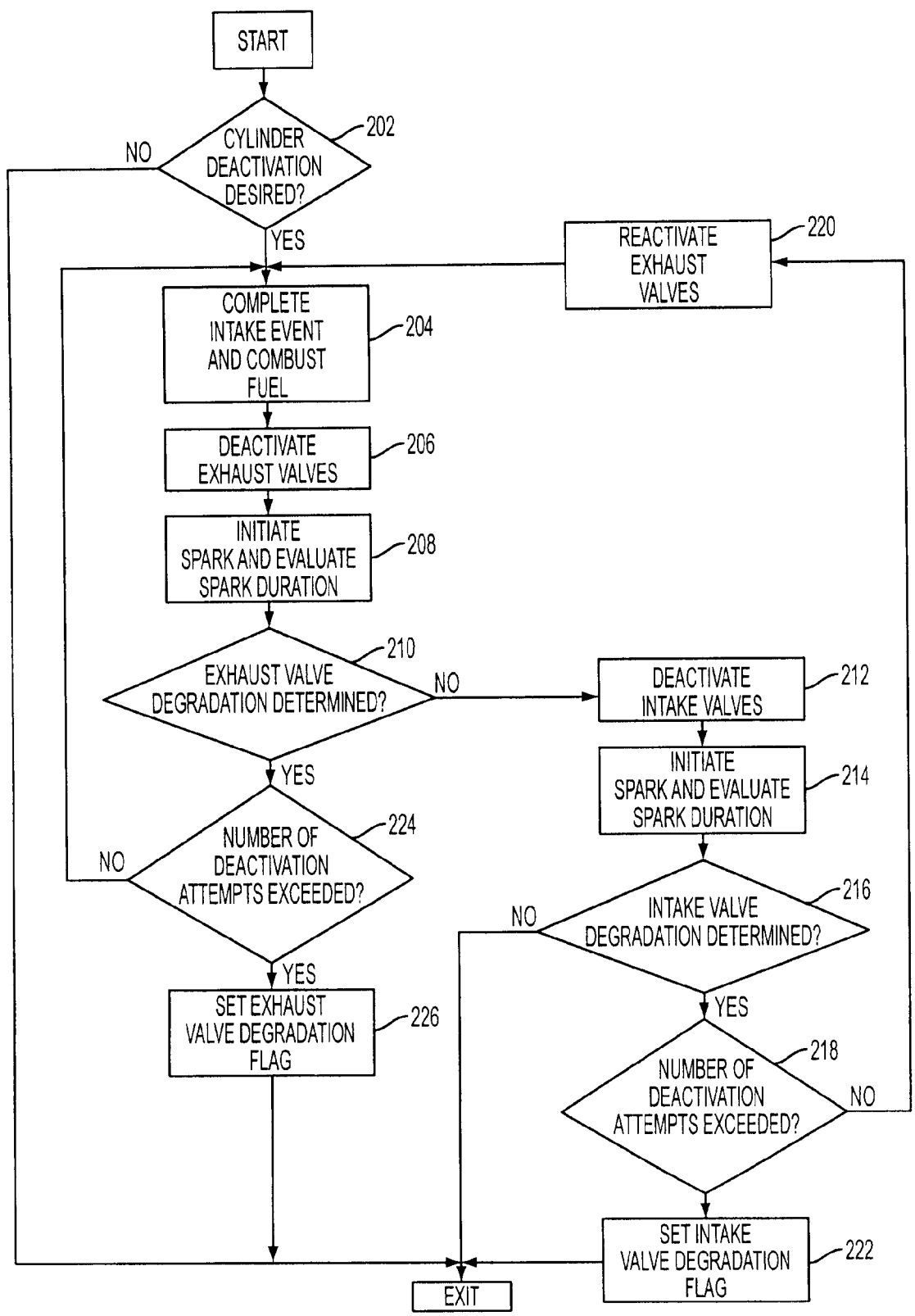
FIG. 2 is a flow chart of an example cylinder valve degradation strategy.

Referring to FIG. 2, a flow chart of an example cylinder deactivation strategy is shown. The strategy determines if valve degradation is present during cylinder deactivation. If so, the routine can take mitigating action, if desired.

In step 202, the routine determines if cylinder deactivation is desired. A cylinder or a group of cylinders may be deactivated when engine operating conditions indicate that engine operating efficiency can be improved while the engine is operating with less than its full complement of cylinders. This determination can be made by assessing engine operating conditions such as operator torque demand, engine temperature, engine speed, and signals alike. The state of each operating condition can be evaluated in conjunction with the other operating conditions (e.g., using Boolean logic or state machines) to make a determination of whether or not cylinder deactivation is desired. If cylinder deactivation is desired, the routine proceeds to step 204. Otherwise, the routine proceeds to exit.

Figure 4:
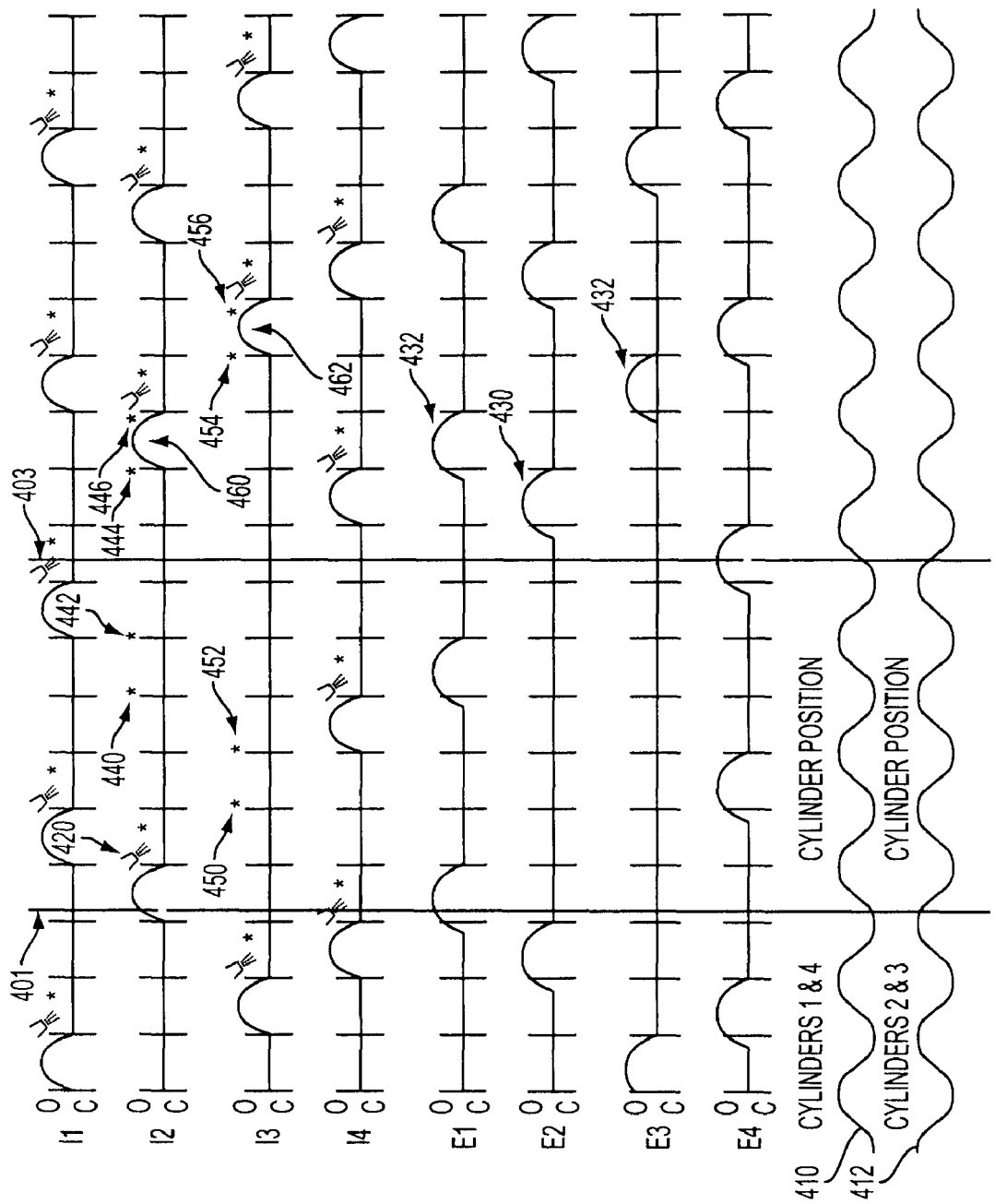
FIG. 4 is an example plot of a cylinder deactivation and reactivation wherein valve degradation is evaluated.

In step 204, the routine completes intake events and combusts fuel in the cylinders to be deactivated. One example of this sequence is illustrated in FIG. 4. The routine determines how many cylinders are to be deactivated and the specific cylinders that will be deactivated. Cylinders are deactivated such that the engine remains in an even firing mode. For example, if two cylinders of a four cylinder are deactivated, cylinders one and four remain active such that the engine combusts and air-fuel mixture every 360 crankshaft degrees. On the other hand, cylinders two and three could remain active instead of cylinders one and four. This would also allow the engine to combust an air-fuel mixture every 360 crankshaft degrees as well. The number of active cylinders is determined, at least in part, by the desired engine torque demand. The specific cylinders to be deactivated may be determined by logic or a state machine, for example. Alternatively, the same group of cylinders may be repeatedly activated and deactivated.

Once a cylinder is selected for deactivation, the routine controls cylinder valves and fuel such that cylinders being deactivated enter the deactivated state with exhaust gases trapped in the cylinder. For example, where a cylinder is partially through an intake stroke when cylinder deactivation is initiated, the intake stroke is completed, combustion occurs, and the exhaust valves remain closed to trap the exhaust gases in the cylinder, see FIG. 4 for example. If on the other hand, the cylinder is partially through its exhaust stroke, the cylinder can complete another intake stroke and combustion event before reaching the deactivated state, if desired. The routine proceeds to step 206.

In step 206, the exhaust valves are deactivated. Exhaust valves may be deactivated using lost motion mechanical devices that stop valve movement by collapsing part of the actuator, by deactivating electrical valves, cam profile switching devices, or by other known methods. As mentioned in step 204, exhaust valves are deactivated such that exhaust remains trapped in the cylinder. The routine proceeds to step 208.

Note that valve deactivation/reactivation may not occur immediately after the valve deactivation/activation command has been issued. For example, if lost motion devices are used to deactivate/activate a cylinder, the devices may be configured to move in relation to camshaft position. Consequently, if a voltage is supplied to a solenoid that controls oil flow to the lost motion device, the lost motion device cannot immediately deactivate/reactivate the valve while the lost motion device is being acted upon by the camshaft because the oil pressure is not significant enough to overcome the force being applied by the camshaft. In this case there will be a latency period between the time the deactivation/reactivation command is issued and when the valve is reactivated/deactivated.

In step 208, a spark is initiated and the spark event attributes are evaluated. The inventors herein have discovered that attributes or characteristics of a spark event can be related to pressure in a cylinder. In one example, the duration of a spark event can be correlated to pressure in a cylinder. In particular, shorter duration spark events indicate higher cylinder pressures while longer duration spark events indicate lower cylinder pressures, see FIG. 7 for example. The pressure/spark duration relationship can be attributed to the effect cylinder pressure has on the spark plug breakdown voltage. Lower cylinder pressure also indicates a lower spark plug gap breakdown voltage, and higher cylinder pressure indicates higher spark plug gap breakdown voltage.

In one example, spark is initiated by allowing current to flow to the primary side of an ignition coil and then interrupting the current flow. When the current flow is interrupted to the primary coil, the magnetic field linking the primary and secondary coils is disturbed and causes the voltage in the secondary coil to increase. The voltage can reach a level that causes a spark to occur at a spark plug that is attached to the secondary side of the ignition coil.

A spark can be generated after a combustion event during the exhaust stroke to determine if the exhaust valves have remained in the closed position as commanded in step 206. The spark may be initiated at a selected position between when the piston is at bottom-dead-center (BDC) and top-dead-center (TDC). In one example, a spark is initiated between ±45 crankshaft degrees of TDC exhaust stroke. In another example, a spark is initiated between ±10 crankshaft degrees of TDC exhaust stroke. An in yet another example, a spark is initiated at substantially TDC (i.e., ±1 TDC) exhaust stroke. By initiating the spark event closer to TDC exhaust stroke, a higher level of differential pressure can be created such that a better signal to noise ratio results. For example, if an exhaust valve is commanded to deactivate in a closed position, but remains open during a portion of the exhaust stroke, the pressure in the cylinder at TDC exhaust stroke approaches atmospheric pressure. On the other hand, if the exhaust valve deactivates in the closed position as commanded, the cylinder pressure will be greater than atmospheric pressure and can therefore provide a stronger indication that valve operation has not degraded. And since the spark event duration is affected by the cylinder pressure, the duration or length of time of the spark event can be used to determine if the exhaust valve operation has degraded.

The spark event duration can be determined in a variety of ways. On method is described in U.S. Pat. No. 7,124,019 which is hereby fully incorporated by reference for all purposes. In this method the spark event duration is determined by monitoring the flyback voltages of the primary ignition coil. The flyback voltage is created by the occurrence of a spark jumping the electrode of a spark plug that is coupled to the secondary coil of an ignition coil. The flyback voltage is converted into a voltage pulse that is related to the spark duration. In another embodiment, flyback voltage on the primary side of an ignition coil can be monitored to determine breakdown voltage. And breakdown voltage can be related to cylinder pressure, see FIG. 7 for example. The routine proceeds to step 210.

In step 210, the routine determines if exhaust valve degradation is present. Each cylinder being deactivated undergoes a valve degradation evaluation. In one example, the length of time of the spark event is used to determine valve degradation, although measures other than time are also anticipated, crankshaft degrees for example. The duration of the spark determined from flyback voltage in step 208 is compared to a predetermined spark duration that has been stored in engine controller memory. If the spark duration determined in step 208 exceeds the predetermined spark duration then valve degradation is determined and the routine proceeds to step 224. Alternatively, if breakdown voltage determined from flyback voltage is below a predetermined level, valve degradation can also be determined. Otherwise, the routine proceeds to step 212.

In step 224, the routine determines if a predetermined number of exhaust valve deactivation attempts have been exceeded. If so, the routine proceeds to step 226. If not, the routine proceeds to step 204 where the cylinder that exhibited exhaust valve degradation attempts the cylinder deactivation process again. Specifically, since the cylinder has been exhausted, an additional intake and an additional compression strokes are performed so that the cylinder may be deactivated with exhaust gases in the cylinder.

In step 226, the routine sets an exhaust valve degradation flag to indicate valve degradation. This flag may be used to inhibit fuel flow and spark to the cylinder experiencing valve degradation if desired. The routine proceeds to exit after the flag is set.

In step 212, intake valves are deactivated. Note that commands to deactivate intake and exhaust valves may occur simultaneously or commands may be issued to deactivate intake valves before exhaust valves without deviating from the scope or intent of this description. In one example, intake valve deactivation occurs in the sequence illustrated by FIG. 4 where exhaust gases are trapped in the cylinder during cylinder deactivation. In particular, the intake valves open during the last combustion cycle prior to cylinder deactivation while the exhaust valves remain closed. Commands are issued to deactivate intake valves and then the routine proceeds to step 214.

Note in another embodiment it is also possible to deactivate a cylinder with fresh charge or an inducted air amount. In this embodiment, exhaust valves are commanded closed after exhausting cylinder contents. The cylinder can be reactivated by combusting at least a fraction of the air that was inducted during the cylinder deactivation process (i.e., combustion can be resumed using the air trapped in the cylinder or intake valves may be activated before exhaust valves to provide fresh air to the cylinder), and then the exhaust valves can resume operation.

In step 214, a spark event is initiated and the spark duration is determined. Step 214 is performed in the same manner as step 208, but the crankshaft angle where the spark is initiated is different. Since intake valves are typically opened during a portion of the intake and compression strokes, a spark is initiated in one of these strokes. In one example, a spark is initiated between ±45 crankshaft degrees from BDC intake stroke. In another example, a spark is initiated between ±10 crankshaft degrees from BDC intake stroke. In still another example, a spark is initiated at substantially BDC (i.e., ±1 crankshaft degree) intake stroke. By initiating a spark in the region of BDC intake stroke, determination of an open intake valve can be improved. If an intake valve is open when exhaust gases are present in a cylinder, a portion of the exhaust gases will be vented to the intake manifold, thereby lowering the cylinder pressure. The cylinder pressure is likely to be lowest when the piston reaches BDC because the intake valve is likely to have been open for some time and because the cylinder volume is greatest near BDC. Therefore, the spark duration can be evaluated at this crankshaft interval to assess intake valve degradation. The routine proceeds to step 216.

In step 216, the routine determines if intake valve degradation is present. Again, each cylinder being deactivated undergoes a valve degradation evaluation. The intake valve degradation evaluation routine also uses the length of time of the spark event to determine valve degradation. The duration of the spark determined in step 214 is compared to a predetermined spark duration that has been stored in engine controller memory. If the spark duration determined in step 214 is shorter than some predetermined spark duration, then valve degradation is determined and the routine proceeds to step 218. Otherwise, the routine proceeds to exit. Alternatively, breakdown voltage can be substituted for spark duration if desired.

In step 218, the routine determines if a predetermined number of intake valve deactivation attempts have been exceeded. If so, the routine proceeds to step 222. If not, the routine proceeds to step 220.

In step 220, exhaust valves are reactivated and the cylinder is evacuated of exhaust gases before the routine proceeds to step 204. By reactivating the exhaust valves, exhaust gases are released to the exhaust manifold rather than the intake manifold. This allows a fresh air charge to be inducted into the cylinder so that another combustion event can occur before another cylinder deactivation attempt.

In step 222, the routine sets an intake valve degradation flag to indicate valve degradation. The flag is a software variable that may also be used to inhibit fuel flow and spark to the cylinder experiencing valve degradation if desired. Further, the flag may be used to notify the operator or other vehicle systems, a hybrid powertrain controller for example, that valve degradation has occurred. The routine proceeds to exit after the flag is set.

Note that the spark events described in steps 208 and 214 may utilize a single spark or multiple spark events may be used over a range of crankshaft angles if desired. For example, a spark may be initialized at 10 crankshaft angle degrees before TDC exhaust stroke and 5 crankshaft angle degrees after TDC exhaust stroke to determine exhaust valve degradation, if desired.

Figure 3:
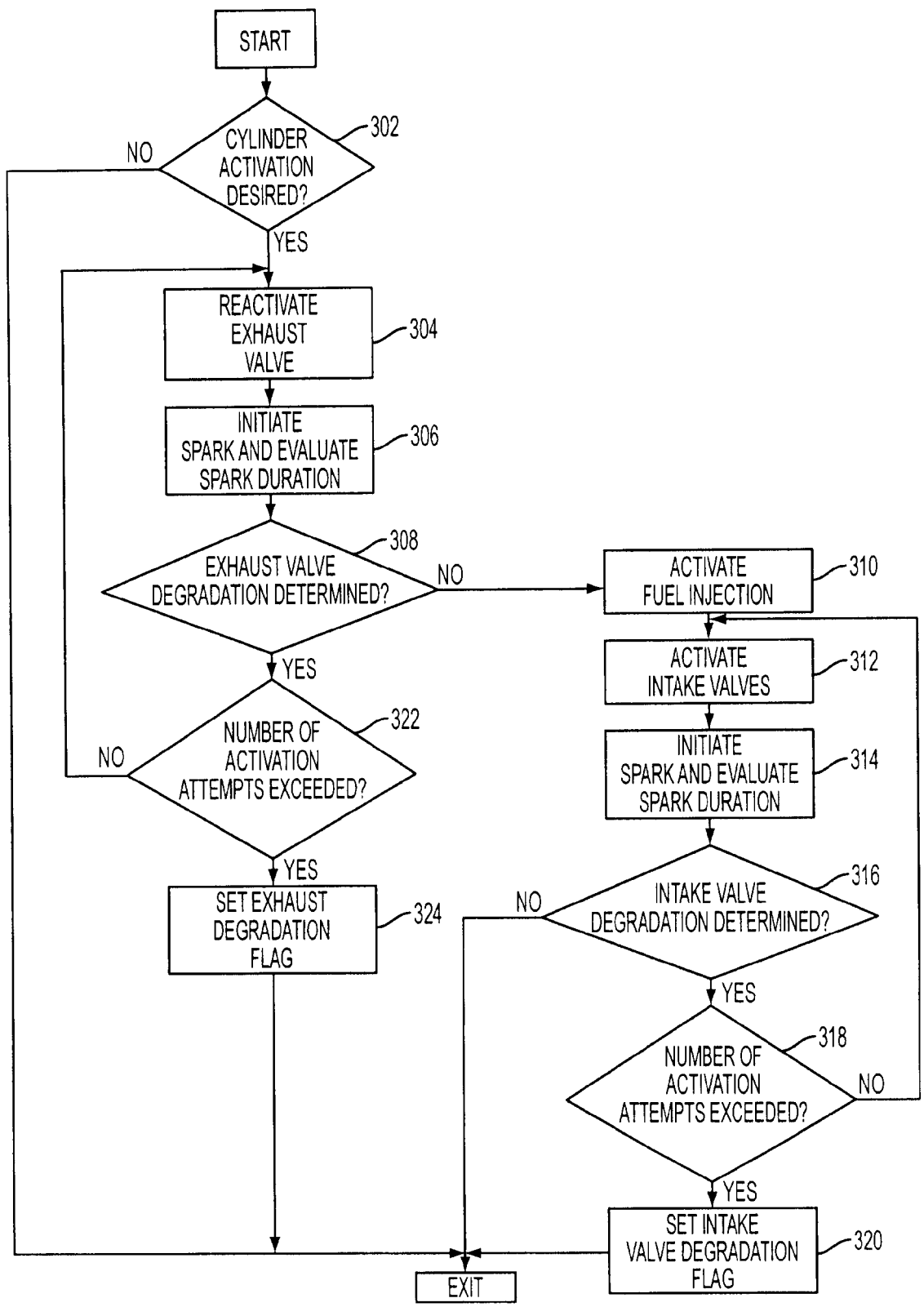
FIG. 3 is another flow chart of an example valve degradation strategy.

Referring now to FIG. 3, a flow chart of an example cylinder reactivation strategy is shown. The strategy determines if valve degradation is present during cylinder reactivation. If so, the routine can take mitigating action.

In step 302, the routine determines if cylinder reactivation is desired. In one example, a cylinder or a group of cylinders may be reactivated when engine operating conditions indicate that an increase in engine performance is desired. This determination can be made by assessing engine operating conditions such as operator torque demand, engine temperature, engine speed, and signals alike. The state of each operating condition can be evaluated in conjunction with the other operating conditions (e.g., using Boolean logic or state machines) to make a determination of whether or not cylinder reactivation is desired. If cylinder reactivation is desired, routine proceeds to step 304. Otherwise, the routine proceeds to exit.

In step 304, the routine reactivates each exhaust valve that has been deactivated. Alternatively, selected exhaust valves may be reactivated. Exhaust valves are reactivated (i.e., commanded to be allowed to open and close during a cylinder cycle) before intake valves so that the cylinder expels exhaust gases before an intake event. This allows a cylinder to restart with a fresh cylinder air charge and it limits the amount of EGR that may be pushed back into the intake manifold. Note that the valve reactivation signals may commence simultaneously, or they may occur at separate times, but the exhaust valves are opened first due to mechanical limitations or signal timing so that exhaust gases are expelled from the cylinder. The routine proceeds to step 306.

In step 306, a spark is initiated and the spark duration is evaluated. A spark is generated in the region where the piston reaches TDC exhaust stroke to determine if the exhaust valves have remained in the closed position in opposition to the commanded issued in step 304. As described in the description of FIG. 2, spark duration and/or breakdown voltage can be related to cylinder pressure, and cylinder pressure during a specific crankshaft angle interval can be related to valve operation. In one example, a spark is initiated between ±45 crankshaft degrees of TDC exhaust stroke. In another example, a spark is initiated between ±10 crankshaft degrees of TDC exhaust stroke. An in yet another example, a spark is initiated at substantially TDC (i.e., ±1 TDC) exhaust stroke. By initiating the spark event closer to TDC exhaust stroke, cylinder pressure at a crankshaft angle that is closer to a higher potential pressure region can be compared against atmospheric pressure. That is, if the exhaust valve opens as instructed, the pressure in the cylinder will approach atmospheric pressure, and as such, can be distinguished from a higher exhaust gas pressure or from a lower cylinder vacuum.

The spark duration and/or breakdown voltage can be determined as described in FIG. 2. The routine proceeds to step 308.

In step 308, the routine determines if exhaust valve degradation is present. A comparison can be made between spark duration/breakdown voltage made at atmospheric pressure and the spark duration/breakdown voltage at a selected crankshaft location. The spark duration/breakdown voltage measured at a specific crankshaft interval in step 306 may be subtracted by the spark duration/breakdown voltage expected at atmospheric pressure. The difference in spark duration/breakdown voltage provides an indication of the cylinder pressure difference, and thus allows the routine to determine if the valves have allowed the cylinder to evacuate and approach atmospheric pressure. If the difference exceeds a predetermined amount, which may indicate a higher or lower cylinder pressure, then exhaust valve degradation is determined. If valve degradation is determined the routine proceeds to step 322. If valve degradation is not determined the routine proceeds to step 310.

In step 322, the routine determines if a predetermined number of exhaust valve reactivation attempts have been exceeded. If so, the routine proceeds to step 324. If not, the routine proceeds to step 304 where the cylinder that exhibited exhaust valve degradation attempts the cylinder/valve reactivation process again.

In step 324, the routine sets an exhaust valve degradation flag to indicate valve degradation. This flag may be used to inhibit fuel flow and spark to the cylinder experiencing valve degradation if desired. The routine proceeds to exit after the flag is set.

In step 310, fuel injection is activated for port injection engines. Fuel is activated in port injection engines before intake valves are opened in the reactivation process so that fuel may be injected to a closed intake valve to improve fuel mixing. If the fuel is to be injected directly into a cylinder fuel injection can be delayed until it has been determined whether or not intake valves have resumed operation, see step 316. The routine proceeds to step 312.

In step 312, intake valves are commanded to reactivate. Similar to step 304, commands to reactivate intake valves may occur simultaneously or commands may be issued to reactivate intake valves before exhaust valves without deviating from the scope or intent of this description. In this example, intake valves are commanded so that they open in the time period after exhaust valves have opened, see FIG. 4 for example. Commands are issued to reactivate intake valves and then the routine proceeds to step 314.

In step 314, a spark event is initiated and the spark duration is determined. Step 314 is performed in the same manner as in step 306 but the crankshaft angle where the spark is initiated is different. Since intake valves are typically opened during a portion of the intake and compression strokes, a spark is initiated in one of these strokes. In one example, a spark is initiated between ±45 crankshaft degrees from BDC intake stroke. In another example, a spark is initiated at between ±10 crankshaft degrees from BDC intake stroke. In still another example, a spark is initiated at substantially BDC (i.e., ±1 crankshaft degree) intake stroke. By initiating a spark in the region of BDC intake stroke, determination of an open intake valve can be improved. If an intake valve does not open after the exhaust valve has opened, the cylinder pressure will be lowered due to the expanding cylinder volume as the piston moves toward BDC. The lower cylinder pressure can affect the spark duration and breakdown voltage such that a vacuum in the cylinder can be distinguished from a cylinder pressure that is closer to atmospheric pressure. Specifically, the breakdown voltage will decrease and the spark duration will increase at lower cylinder pressures. The routine proceeds to step 316.

In step 316, the routine determines if intake valve degradation is present. If the spark duration determined in step 314 exceeds the predetermined spark duration, then intake valve degradation is determined and the routine proceeds to step 320. Alternatively, breakdown voltage may be used to determine intake valve degradation by comparing the monitored voltage to a predetermined amount. If intake valve degradation is not determined the routine activates fuel delivery for port fuel injected engines and proceeds to exit (Note that fuel is reactivated in port fuel injected engines by this step).

In step 318, the routine determines if a predetermined number of intake valve reactivation attempts have been exceeded. If so, the routine proceeds to step 320. If not, the routine proceeds to step 312.

In step 320, the routine sets an exhaust valve degradation flag to indicate valve degradation. This flag may be used to inhibit fuel flow and spark to the cylinder experiencing valve degradation if desired. The routine proceeds to exit after the flag is set.

Referring now to FIG. 4, an example valve timing sequence during a cylinder deactivation event is shown. The illustrated sequence is a simulation that represents cylinder valve events for a four cylinder engine operating in a four-stroke cycle. Since it is possible to achieve the various illustrated valve trajectories present in the description using a variety of actuator types (e.g., electrically actuated, hydraulically actuated, and mechanically actuated), the type or design of the actuator employed is not meant to limit or reduce the scope of the description. In this example, the trajectories represent possible trajectories for intake valves that can mechanically deactivate (I1-I4) and exhaust valves that can mechanically deactivate (E1-E4). The letter "O" near the left margin indicates the valve opening region for the valve trajectory. The letter "C" indicates the valve closing region for the valve trajectory.

The intake and exhaust valve position histories go from the left to the right hand side of the figure. The intake valve trajectories are labeled I1-I4 while exhaust valve trajectories are labeled E1-E4. The vertical markers along the valve trajectory paths identify the top-dead-center and bottom-dead-center positions for the respective cylinders. Vertical line 401 represents an example of an indication of where in time a request to deactivate cylinders has occurred, vertical line 403 indicates the cylinder reactivation command position. Example engine fuel injection timing is indicated by injector spray representations (e.g., 420) and engine spark timing is indicated by an "*". Fuel injection timing for a direct injected engine is shown, although the methods illustrated apply as well to port injected engines. The valve timing and engine position markers can be related to the piston position of each cylinder of the engine (e.g., lines 410 and 412). Pistons 1 and 4 are in the same positions in their respective cylinders while cylinders 2 and 3 are 180° out of phase with cylinders 1 and 4.

After a request to deactivate cylinders at 401, the intake valves of cylinder 2 and 3 complete their current cycle and are then shown held closed until the cylinder reactivation request 403. The valves may be held closed by lost motion devices that collapse and do not provide sufficient force to overcome the valve spring when a cam lobe passes the lost motion device. For electrically actuated valves, current can be supplied to a closing coil, thereby holding the valve in closed. In this example, the cylinder deactivation request occurs during an intake event of cylinder two, and the injection timing is performed when the intake valve of the respective cylinder is closed. Cylinder number two intake valve is shown finishing the induction event that is in progress when the request to deactivate cylinders is received. However, as mentioned above, it is also possible to shut the intake valve earlier after a request to deactivate cylinders so that the cylinder charge is reduced, if electrically actuated valves are used for example. The last combustion event for the cylinders being deactivated is shown in cylinder two since the intake valves of cylinder three are held closed after the engine stop request.

In this example, the mechanically actuated exhaust valves of cylinders two and three are also deactivated after the cylinder deactivation request. The exhaust valves are closed such that gases from the last combustion event prior to cylinder deactivation are trapped within the respective cylinders. As mentioned above, the trapped exhaust gases act as a spring storing and releasing energy as the crankshaft rotates, thereby reducing deactivated cylinder losses and oil consumption. The exhaust valves may be deactivated by known mechanical deactivation devices.

Evaluation of exhaust valve degradation during cylinder deactivation and is initiated at spark events 440 and 450. The spark events are initiated at TDC cylinder two and three respectively. This location offers a high signal to noise ratio in terms of cylinder pressure verses atmospheric pressure. If the exhaust valves were to continue to open and close in accordance with the mechanical cam profile, exhaust pressure would approach atmospheric pressure since the exhaust gases would have an opportunity to pass the exhaust valve at this crankshaft angle timing. Thus, the illustrated TDC locations provide locations that reduce the possibility of observing near atmospheric cylinder pressure when the valves are in the desired close position. Note that the spark timing can be advanced or retarded from this location to avoid evaluating exhaust degradation where valve overlap may be encountered, if desired.

Evaluation of intake valve degradation occurs during cylinder deactivation is initiated at spark events 442 and 452. The spark events are initiated at BDC cylinder two and three. This location is selected to evaluate the cylinder pressure at a position where the intake valve would be open if it were to continue to operate in accord with a typical intake valve schedule. If the valve continues to operate, the BDC location will provide a position where cylinder pressure is expected to be low. If the exhaust valves close as desired and exhaust valve degradation is not determined, the cylinder pressure will be above atmospheric pressure when the intake valve is held closed since the cylinder mixture expands with combustion. Consequently, if intake and exhaust degradation is not present the cylinder pressure is expected to be above atmospheric pressure, if there is intake valve degradation, the cylinder pressure is expected to be below or near atmospheric pressure. Therefore, the spark duration can be used to distinguish between different modes of valve degradation.

After cylinder reactivation is requested 403, the sequence begins with exhaust valve reactivation 430 and 432. Cylinder number two exhaust valve is reactivated first in this sequence because of the engine position where the reactivation request occurred; however, if the reactivation request location were change, reactivation of cylinder number three exhaust valve would lead the reactivation sequence. As mentioned above, the exhaust valves are reactivated first so that exhaust gases remaining in the cylinder is discharged before a new air-fuel mixture is inducted into the cylinder. This ensures cylinder reactivation and improves cylinder charge consistency.

Exhaust valve degradation is assessed at spark events 444 and 454. The spark events are generated at TDC exhaust for the respective cylinders. This location provides an opportunity for exhaust gases to be evacuated from the cylinders before the evaluation is made. If the exhaust valves operate in accordance with four-cycle timing, the cylinder pressure will approach atmospheric pressure since the exhaust system is vented to atmosphere. If the exhaust valve degradation occurs, the cylinder pressure can be higher than atmospheric because the cylinder volume is at its lowest level. Consequently, if the spark duration reflects a pressure that is less than a predetermined pressure for the particular engine speed and load, exhaust valve degradation can be determined.

Cylinder number two and three intake valves are reactivated at valve opening events 460 and 462. If the intake valves open in accord with four-stroke valve timing, air is inducted into the cylinder and the cylinder pressure will be near atmospheric pressure or lower. On the other hand, if the intake valves do not open as scheduled, the cylinder pressure will decrease as the piston approaches BDC where the cylinder volume is the greatest. Thus, intake valve degradation can be evaluated during cylinder reactivation based on the difference between observed cylinder pressure and expected cylinder pressure. That is, if cylinder pressure is lower than the expected cylinder pressure, intake valve degradation can be determined because the cylinder pressure will be lower.

Figure 5A:
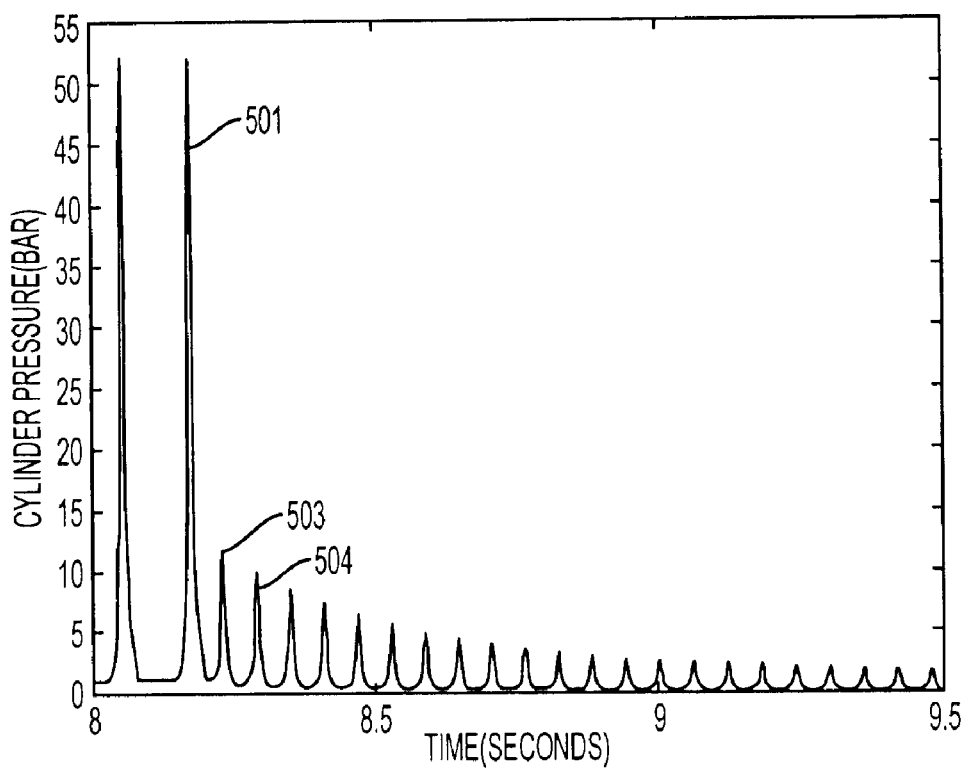
FIG. 5a is a plot that illustrates cylinder pressure during cylinder deactivation without valve degradation.

Referring now to FIG. 5a, simulation results for a desired cylinder deactivation sequence is shown. The sequence illustrates cylinder pressure for a single cylinder that is deactivated. The Y-axis identifies the cylinder pressure while the X-axis indicates time. The last combustion event is indicated by the cylinder pressure near label 501. The first deactivated cylinder pressure peaks 503 and 504 represent TDC compression and TDC exhaust locations respectively for the deactivated cylinder. The peak cylinder pressures decay with time as a portion of compressed exhaust gases pass piston rings.

Figure 5B:
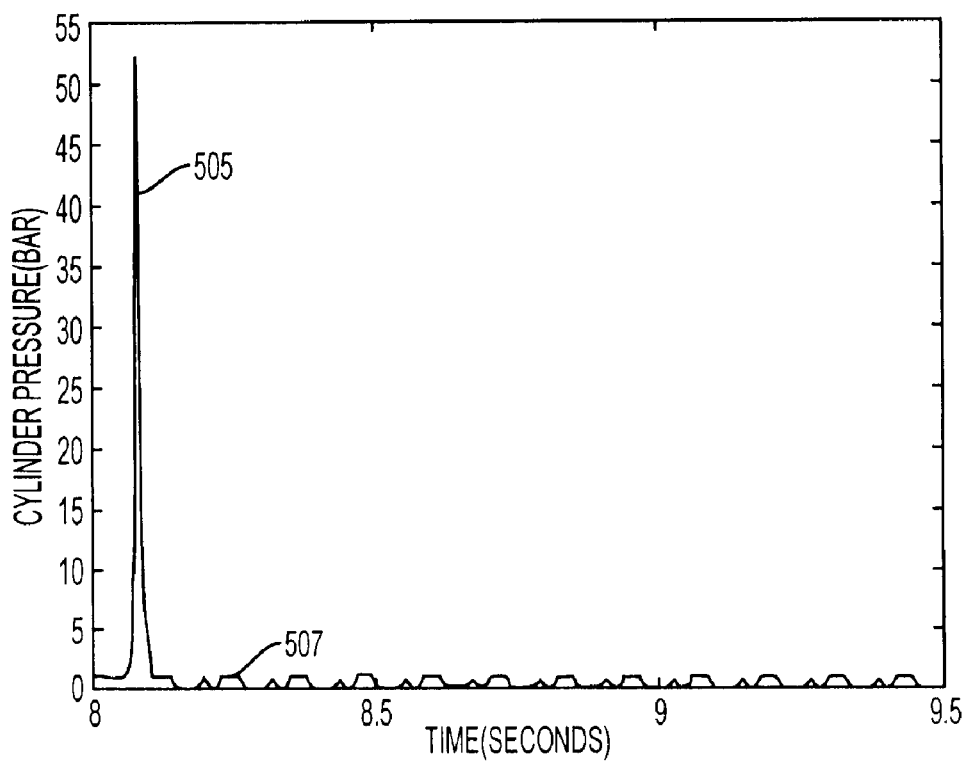
FIG. 5b is a plot that provides one example of cylinder pressure during cylinder deactivation when valve degradation is present.

Referring now to FIG. 5b, simulation results for degraded valve operation during cylinder deactivation is shown. Similar to FIG. 5a, the sequence illustrates cylinder pressure for a single cylinder that is deactivated. However, in this figure, the effect of valve degradation is shown. Label 505 identifies the last combustion event cylinder pressure before the cylinder is deactivated. Label 507 illustrates cylinder pressure when the cylinder has been deactivated but where there is valve degradation. Comparing FIG. 5a to FIG. 5b, the cylinder pressure after cylinder deactivation in FIG. 5b is lower than that shown in FIG. 5a. The difference can be attributed to an exhaust valve being open during the exhaust stroke while the intake valves are held closed during the cylinder cycle. Since the exhaust valves continue to operate in four-stroke timing, the cylinder pressure is reduced. The difference in cylinder pressure from FIG. 5a to FIG. 5b, particularly at the first two times the cylinder reaches TDC, allows a spark to be generated at the TDC location from which valve degradation can be determined.

Figure 6A:
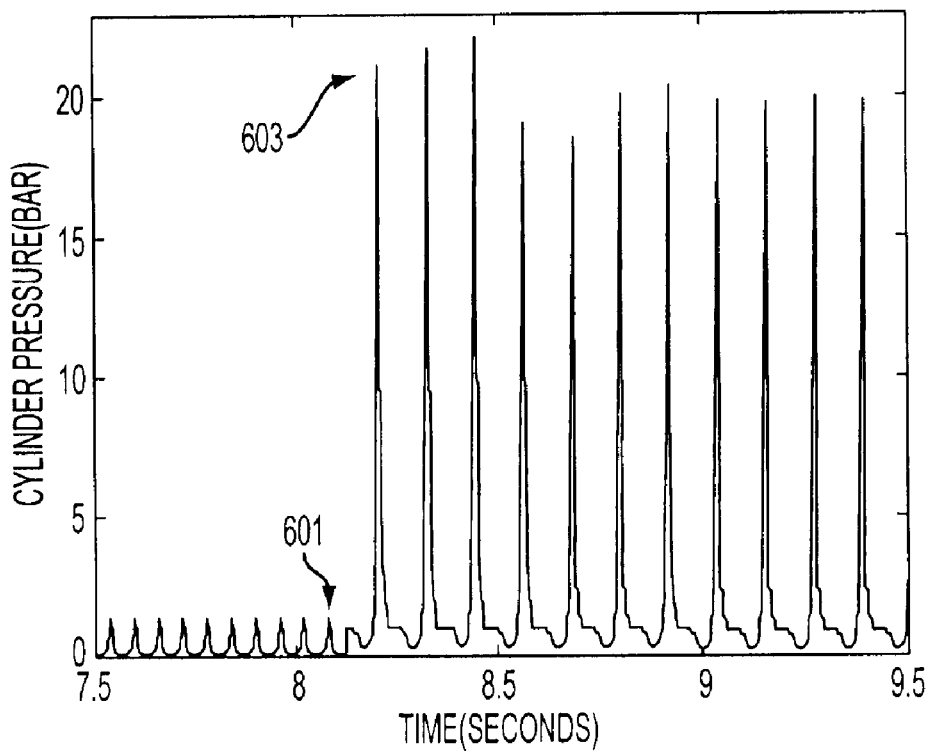
FIG. 6a is a plot that illustrates cylinder pressure during cylinder activation without valve degradation.

Referring now to FIG. 6a, simulation results for a desired cylinder reactivation sequence is shown. Like FIGS. 5a and 5b, the sequence illustrates cylinder pressure for a single cylinder, but in this case, the cylinder is reactivated. The Y-axis identifies the cylinder pressure while the X-axis indicates time. The last deactivated cylinder pressure peak occurs at 601, then the cylinder pressure increases in pressure pulse 603 indicating combustion has commenced. Notice also that there appear to be one half the number of pressure peaks as compared to before the cylinder was reactivated. This is because a pressure peak occurs at every TDC (intake and exhaust) when the intake and exhaust valves are simultaneously closed. After the cylinder reactivates the peak pressure occurs slightly after TDC due to the expansion of combusted gasses, so only one pressure peak is indicated for each cylinder cycle.

Figure 6B:
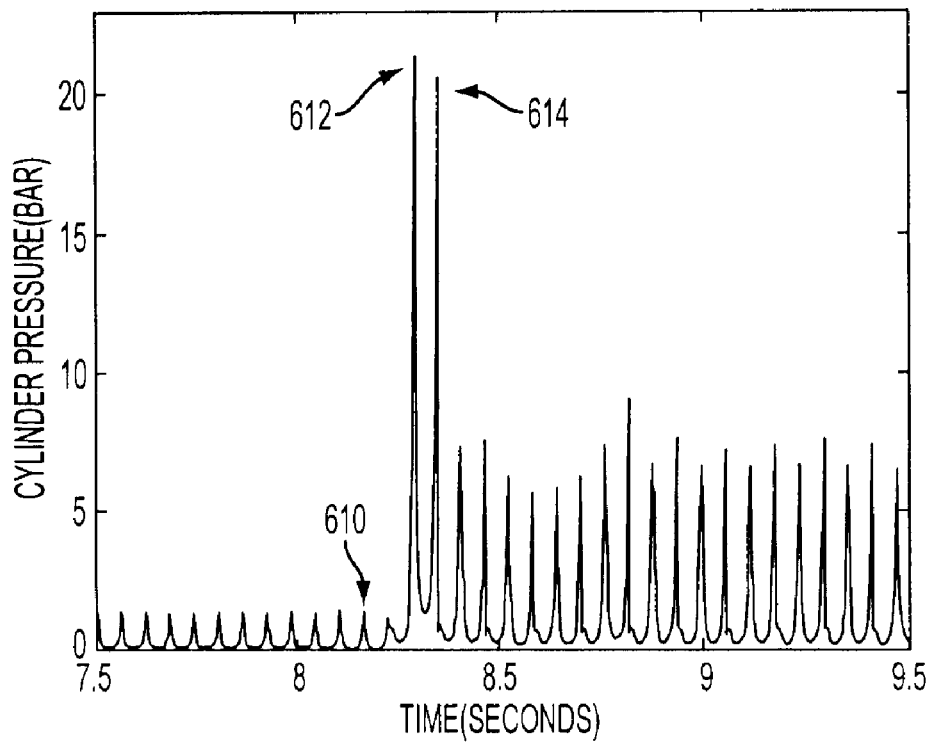
FIG. 6b is a plot that provides one example of cylinder pressure during cylinder reactivation when valve degradation is present.

Referring now to FIG. 6b, simulation results for degraded valve operation during cylinder reactivation is shown. Similar to FIG. 6a, the sequence illustrates cylinder pressure for a single cylinder that is reactivated. However, in this figure, the effect of valve degradation is shown. Label 610 identifies a pressure pulse in the last cylinder cycle before the cylinder is reactivated. Label 612 illustrates cylinder pressure when the cylinder has been reactivated and is elevated due to combustion. If exhaust valve degradation is evaluated as described in step 306 of FIG. 3, it is possible to avoid this condition since spark could be inhibited when exhaust valve degradation is determined. Alternatively, a spark can be generated at the crankshaft angle where the second pressure pulse occurs 614, and valve degradation can be indicated by the spark duration that reflects the higher cylinder pressure. The cylinder pressure pulses after label 614 are at a level that reflects working intake valves an exhaust valves that remain in the closed position. As a result, the cylinder pressure is elevated from the level that it assumed before label 612 because air is being repeatedly inducted and compressed, thereby maintaining a steady supply of air compressed in the cylinder.

Figure 7:
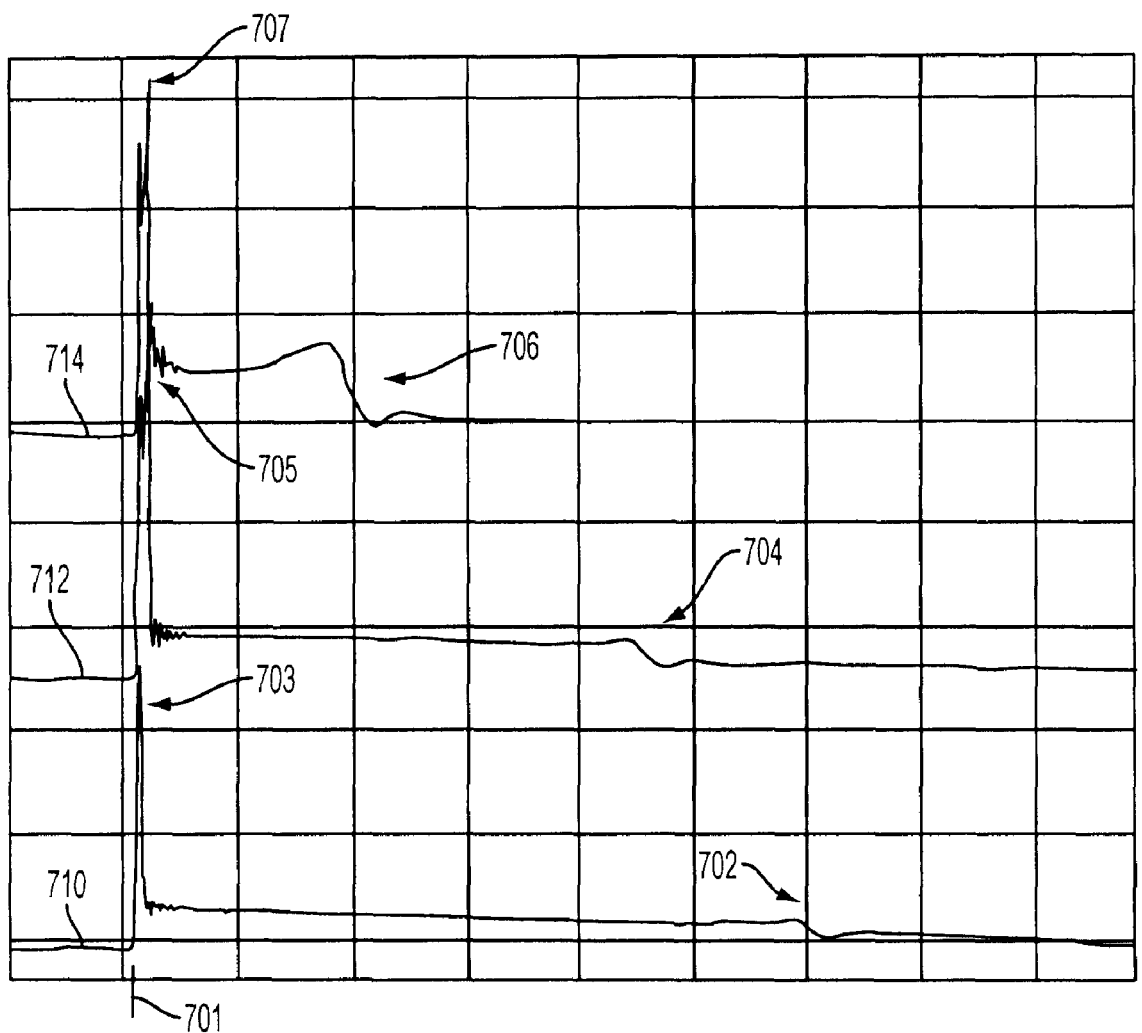
FIG. 7 is a plot that illustrates the influence that cylinder pressure has on spark duration.

FIG. 7 is a plot that illustrates the influence that cylinder pressure has on flyback voltage and spark duration. Curves 710, 712, and 714 are example flyback voltage traces monitored at a switching device that controls current flow through the primary side of an ignition coil. Each curve represents the flyback voltage signature for an individual ignition coil. Three curves are shown for illustration purposes.

The curves illustrate primary side ignition coil voltage that is generated after current flow is stopped in the primary coil. When current flowing to the primary coil is interrupted, the magnetic field generated by the current collapses and voltage is increased on the secondary side of the ignition coil. The increased secondary coil voltage is reflected back to the primary coil and is observable as shown in FIG. 7. Label 701 indicates where current flow to the primary coil is interrupted and where the spark event begins.

Curve 710 represents the voltage observed after spark is initiated in a cylinder having low pressure. Label 703 points to the breakdown voltage generated during the ignition event. The breakdown voltage is the voltage at which a spark is produced across the spark plug gap. Similarly, labels 705 and 707 refer to breakdown voltages for spark events at increasingly higher cylinder pressures. That is, the pressure in the cylinder where flyback voltage curve 712 was generated is higher than the pressure at which flyback voltage curve 710 was generated. Likewise, the cylinder pressure at which flyback voltage curve 714 was generated was higher than the cylinder pressure at which curve 712 was generated. In this example, the breakdown voltages observed are 12.7 kV for curve 710, 17.6 kV for curve 712, and 18.8 kV for curve 714 when the ignition coils were charged to the same level. Each voltage curve settles to a plateau after reaching the breakdown voltage. This plateau represents the time that the spark arc is sustained across the spark plug gap. Labels 706, 704, and 702 indicate the end of the spark event.

Notice that the breakdown voltage increases as cylinder pressure increases. Also note that the spark duration is reduced as the cylinder pressure increases. The higher the breakdown voltage, the less energy is left in the coil to sustain the spark event. Therefore, breakdown voltage and spark duration (i.e., the length of time from initiating a spark event until the arc ceases) can be used to determine cylinder pressure. In one embodiment, breakdown voltage is determined by a level detecting circuit that outputs a digital value corresponding to the determined breakdown voltage. In another embodiment, the spark duration is determined by filtering the flyback voltage and converting it into a digital signal capable of being input to a microprocessor or similar device (e.g., programmable gate array). This can be accomplished by attaching a high impedance tap to the primary ignition coil. The ignition coil voltage can then be clamped by diodes or capacitors and input to a Schmidt trigger level detecting device. The now digital signal may be processed to determine the spark duration. Note: variations in the filtering circuitry are anticipated; therefore, the specific circuitry described herein is not intended to limit the scope or breadth of this description.

As will be appreciated by one of ordinary skill in the art, the routines described in FIGS. 2-3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to determine degradation of a cylinder valve for an internal combustion engine, the method comprising:
   initiating a spark event in at least a cylinder of an internal combustion engine; and
   indicating valve degradation from at least an attribute of said spark event.

2. The method of claim 1 wherein said at least an attribute of said spark event is a duration or breakdown voltage of said spark event.

3. The method of claim 2 wherein said duration is used to as an inference of pressure in said at least a cylinder.

4. A method to determine degradation of a cylinder valve for an internal combustion engine, the method comprising:
   initiating a spark event in at least a cylinder of an internal combustion engine; and
   indicating valve degradation from flyback voltage produced by said spark event.

5. The method of claim 4 further comprising filtering and converting said flyback voltage to a digital signal for determining the spark duration or breakdown voltage of said spark event.

6. The method of claim 4 wherein said valve degradation is comprised of a valve that is not following a desired trajectory.

7. The method of claim 4 wherein said spark event is initiated during an exhaust stroke.

8. A method to determine degradation of a variable event valvetrain, the method comprising:
   inducting an amount of air into at least one cylinder during a combustion cycle;
   deactivating said at least one cylinder after inducting said amount of air;
   providing an indication of at least a degraded valve operable in said at least a cylinder, said indication provided after deactivating said at least a cylinder; and
   said indication produced, at least in part, from flyback voltage of an ignition coil.

9. The method of claim 8 wherein said flyback voltage is evaluated to determine the spark duration or breakdown voltage.

10. The method of claim 8 wherein said at least one cylinder is deactivated by commanding at least a valve to a closed position for at least a cycle of said cylinder.

11. The method of claim 8 wherein said internal combustion engine is coupled to a hybrid powertrain.

12. The method of claim 8 wherein said spark event is initiated when a piston in said at least one cylinder is within ±10 crankshaft angular degrees of top-dead-center.

13. The method of claim 8 wherein at least one exhaust valve of said at least a cylinder is deactivated by a cam profile switching device before said indication.

14. The method of claim 8 further comprising deactivating fuel flow to said at least one cylinder before the end of said combustion cycle.

15. The method of claim 8 wherein said cylinder is deactivated, at least in part, by changing the state of a cam profile switching device.

16. A method to determine degradation of a variable event valvetrain, the method comprising:
   deactivating at least a cylinder by holding at least a valve in a position as a crankshaft rotates;
   commanding said at least a valve to operate; and
   initiating a spark event in said at least a cylinder and providing an indication of at least a degraded valve operable in said at least a cylinder as the duration of a spark event in said at least a cylinder varies from a predetermined duration.

17. The method of claim 16 wherein said spark event is initiated when the piston in said at least a cylinder is substantially at top-dead-center.

18. The method of claim 16 wherein said command to operate said at least a valve is delivered before said spark event is initiated.

19. The method of claim 16 wherein said position is a closed position.

20. The method of claim 16 wherein said at least a valve is an exhaust valve.

21. The method of claim 16 wherein said duration is obtained by monitoring flyback current from an ignition coil.

22. A computer readable storage medium having stored data representing instructions executable by a computer to control an electrically actuated valve in a cylinder of internal combustion engine of a vehicle, said storage medium comprising:
   instructions for operating at least one valve of at least one cylinder after said at least one cylinder has been deactivated for at least on cylinder cycle;
   instructions for initiating a spark in said at least a cylinder before fuel is injected or inducted to said at least a cylinder; and
   instructions for determining degradation of said at least one valve from flyback voltage produced after initiating said spark.

23. The method of claim 22 wherein a microprocessor determines the duration of said spark.

24. The method of claim 22 wherein a breakdown voltage is determined from said flyback voltage.

* * * * *